(12) United States Patent
Tomita

(10) Patent No.: US 7,489,319 B2
(45) Date of Patent: Feb. 10, 2009

(54) LIGHT SOURCE DEVICE FOR THREE-DIMENSIONAL DISPLAY

(75) Inventor: Seijiro Tomita, Tokyo (JP)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 84 days.

(21) Appl. No.: 10/535,626

(22) PCT Filed: Nov. 20, 2002

(86) PCT No.: PCT/JP02/12128

§ 371 (c)(1),
(2), (4) Date: Dec. 2, 2005

(87) PCT Pub. No.: WO2004/046788

PCT Pub. Date: Jun. 3, 2004

(65) Prior Publication Data

US 2006/0152523 A1 Jul. 13, 2006

(51) Int. Cl.
*G06T 15/00* (2006.01)
(52) U.S. Cl. .................. 345/589; 348/42; 382/154
(58) Field of Classification Search .......... 345/589; 348/42; 382/154
See application file for complete search history.

(56) References Cited

U.S. PATENT DOCUMENTS

| 4,934,773 | A | * | 6/1990 | Becker | 359/214 |
| 5,936,774 | A | * | 8/1999 | Street | 359/630 |
| 6,757,422 | B1 | * | 6/2004 | Suzuki et al. | 382/154 |
| 7,272,275 | B2 | * | 9/2007 | Spoonhower et al. | 385/15 |

FOREIGN PATENT DOCUMENTS

| JP | 8-68962 | 3/1996 |
| JP | 8-201726 | 8/1996 |
| JP | 10-253925 | 9/1998 |

* cited by examiner

*Primary Examiner*—Phu K Nguyen
(74) *Attorney, Agent, or Firm*—Edwards Angell Palmer & Dodge LLP

(57) ABSTRACT

A highly precise and durable light source device 50 for a three-dimensional display does not use a mechanical construction and thus can rapidly move an illuminating point on a light source to a position that best matches the positional movement of an observer. The light source device has an image display means 52 that creates an image using transmitted light. The LED arrays 51U, 51D of white LEDs 1 are arranged in two tiers and display a right-eye image and a left-eye image, respectively. The light source device also has an LED control means 53 that performs a turn-on control on the white LEDs 1 in the LED 51U, 51D.

9 Claims, 4 Drawing Sheets

(a)

(b)

LIGHT SOURCE DEVICE FOR THREE-DIMENSIONAL DISPLAY

BACKGROUND OF THE INVENTION

1. Field of the Invention

The present invention relates to a light source device for a three-dimensional display which rapidly turns on a small number of LEDs to present a stereoscopic image to an observer in a wide range of viewing angles even if the observer moves sideways or the image is viewed by two or more observers from multiple visual points. More particularly, the invention relates to a light source device for three-dimensional display that has an image display means for creating an image using transmitted light.

2. Description of the Related Art

A technology for visualizing an object in three dimensions has been under development and studies on a method of displaying a three-dimensional image have been conducted in many fields, with a variety of techniques already put to practical use. There are two types of three-dimensional visualization systems. One type requires an observer to wear a device such as special eyeglasses or goggles and the other uses no special device on the observer.

The first system (eyeglass type) includes a so-called anaglyph system, in which a viewer wears a pair of eyeglasses, one attached with a red filter and the other with a blue filter; and a polarized eyeglass system, which uses a pair of eyeglasses attached with polarizing filters that transmit linearly polarized light and whose transmission axes are set perpendicular to each other. In these systems a viewer sees with his two eyes disparate images of an object that produce a binocular parallax so that the viewer can see a generally stereoscopic view. However, with these systems the viewer needs to wear cumbersome special eyeglasses.

Among proposed stereoscopic display systems that do not use the special eyeglasses are a parallax barrier system and a lenticular system.

Japanese Patent Disclosure No. 10-63199 discloses a stereoscopic imaging system in which, as shown in FIG. 4, a right-eye polarizing filter portion 66a and a left-eye polarizing filter portion 66b with their respective polarizing axes set perpendicular to each other are arranged on the left- and right-side areas of a light emitting surface of a two-dimensional or 2D light source 65; in which rays of light that have passed through the filter portions 66a, 66b are collimated by a Fresnel lens 63 into parallel rays that are then projected onto a liquid crystal device 62; and in which the liquid crystal device 62 has on both surfaces thereof linear polarizing filters 621, 622 each comprising horizontal lines of filters La, Lb having their polarizing axes set perpendicular to each other, with the horizontal filter lines La, Lb alternated in the vertical direction. In this example, the opposing linear polarizing filter lines, one on the light source 65 side and the other on the viewer side, are set such that their respective polarizing axes are perpendicular to each other. A liquid crystal panel 620 of the liquid crystal device 62 has an image formed thereon so that image information for the right eye and image information for the left eye are arranged along the horizontal filter lines of the two opposite polarizing filters and alternated in the vertical direction, permitting either of the items of image information to appear every other horizontal line.

In any of the systems described above—the binocular parallax barrier system, the lenticular system and the system disclosed in Japanese Patent Disclosure No. 10-63199—because the stereoscopic viewing range is limited, if the observer's position is shifted left or right even slightly, the stereoscopic image is inverted left or right, or if it is a case of the invention published in Japanese Patent Disclosure No. 10-63199, only a 2D image is displayed. Another problem with this system is that an image can only be presented to a single observer. To deal with these problems, a method (for example, Japanese Patent Disclosure No. 8-262370) has been proposed which involves measuring the position of an observer and mechanically moving the light source (as indicated by an arrow A in FIG. 4) according to the observer's movement. This method, however, is not practical because of its slow response speed and because a mechanical driving device easily wears out and lacks sufficient durability. Further, when an on observer shifts sideways, he or she cannot see the intended stereoscopic image.

Further, in a case where a 2D image signal is received, even if the images for the left and right eyes are displayed at the same time on a three-dimensional display which cannot display the 2D image, when the position of an observer shifts left or right even slightly, the two images reaching the left and right eyes have half an original vertical resolution of the liquid crystal device because both the left and right eyes receive both the left- and right-eye 2D images.

The present invention has been accomplished to overcome these problems. A first object of the present invention is to provide a highly precise and durable light source device for three-dimensional display which does not use a mechanical construction and thus can rapidly move an illuminating point on a light source to a position that best matches the positional movement of an observer. In this invention, a control to move the position of an illuminating point on a light source is referred to as a turn-on control.

A second object of this invention is to provide a light source device for three-dimensional display which can turn a light source on and off at a speed high enough to allow the light source to be turned off during a synchronization signal and blanking periods to eliminate unwanted afterimages and interferences and to reduce power consumptions significantly. In this invention, a control for turning off the light source during the synchronization signal and blanking periods is referred to as a turn-off control.

A third object of this invention is to provide a light source device for three-dimensional display which, when used on a time-division type three-dimensional display, can obviate the use of a shutter device in a light source thus simplifying the construction and eliminating a light transmission loss.

A fourth object of this invention is to provide a light source device for three-dimensional display which, with a limited number of LEDs as a light source, can form a wide viewing angle image on a two- or three-dimensional display. In this case, by using a known eye position tracking device, such as an ultrasonic tracking device, infrared tracking device or image tracking device, it is possible to present a stereoscopic image to an observer even if eyes of the observer move or the display is viewed by two or more observers.

A fifth object of this invention is to provide a light source device for three-dimensional display which can easily display a 2D image signal at an increased resolution because it is desired that the three-dimensional display can display a 2D image.

SUMMARY OF THE INVENTION

The present invention solves the above-mentioned problems with the following means.

A first aspect of the present invention provides a light source device for three-dimensional display having an image display means, wherein the image display means forms an image using transmitted light, the light source device comprising: an LED array having white LEDs or RGB LEDs arranged in two horizontal rows one above the other, wherein the upper and lower LED arrays constitutes a light source portion for presenting an image for the right eye and a light source portion for presenting an image for the left eye, respectively.

A second aspect of the present invention provides an LED control means which is based on a technology for a light source device for a three-dimensional display according to the first aspect and performs a turn-on or -off control of the white LEDs or RGB LEDs in the LED arrays.

A third aspect of the present invention provides a light source device for three-dimensional display according to either the first aspect or the second aspect, wherein the display has a position identifying means which measures a position of an observer relative to the display and outputs a corresponding position signal, and the LED control means performs a turn-on control on the white LEDs or RGB LEDs based on the position information so as to keep an image viewable by the observer.

A fourth aspect of the present invention provides a light source device for three-dimensional display according to either the first aspect or the second aspect, wherein the display has a controller operated by the observer, and the LED control means performs a turn-on control on the white LEDs or RGB LEDs based on operation information from the controller so as to change an image viewed by the observer.

A fifth aspect of the present invention provides a light source device for three-dimensional display according to either the first aspect or the second aspect, wherein the display has a position identifying means which counts the number of observers, measures positions of the observers relative to the display and outputs corresponding position signals, and the LED control means performs a turn-on control on the white LEDs or RGB LEDs based on the position information so as to keep images viewable by the observers.

A sixth aspect of the present invention provides a light source device for three-dimensional display according to either the first aspect or the second aspect, wherein the right-eye image light source portion and the left-eye image light source portion of the LED array are on-off controlled.

A seventh aspect of the present invention provides a light source device for three-dimensional display according to either the first aspect or the second aspect, wherein the LED control means changes an interval between lighted parts of the right-eye image light source portion and the left-eye image light source portion of the LED array according to a distance of an observer from the display.

An eighth aspect of the present invention provides a light source device for three-dimensional display according to either the first aspect or the second aspect, wherein the two horizontal rows, one above the other, of the white LEDs or RGB LEDs in the LED array are arranged such that the LEDs in one of the rows are alternated from or placed side by side with those in the other row, and the LED control means performs the turn-on control on all the LED horizontal rows in the LED array.

According to a ninth aspect of the present invention, the LED control means turns on and off appropriate white LEDs in the LED array and scans the illuminating LEDs across the LED array at high speed in a horizontal direction.

According to a tenth aspect of the present invention, the light source device for three-dimensional display can be used on three- or two-dimensional displays of television sets, game machines, personal computers, cell phones or mobile terminals.

DETAILED DESCRIPTION OF THE PREFERRED EMBODIMENT

Now, embodiments of the present invention will be described by referring to the accompanying drawings.

Figure 1:
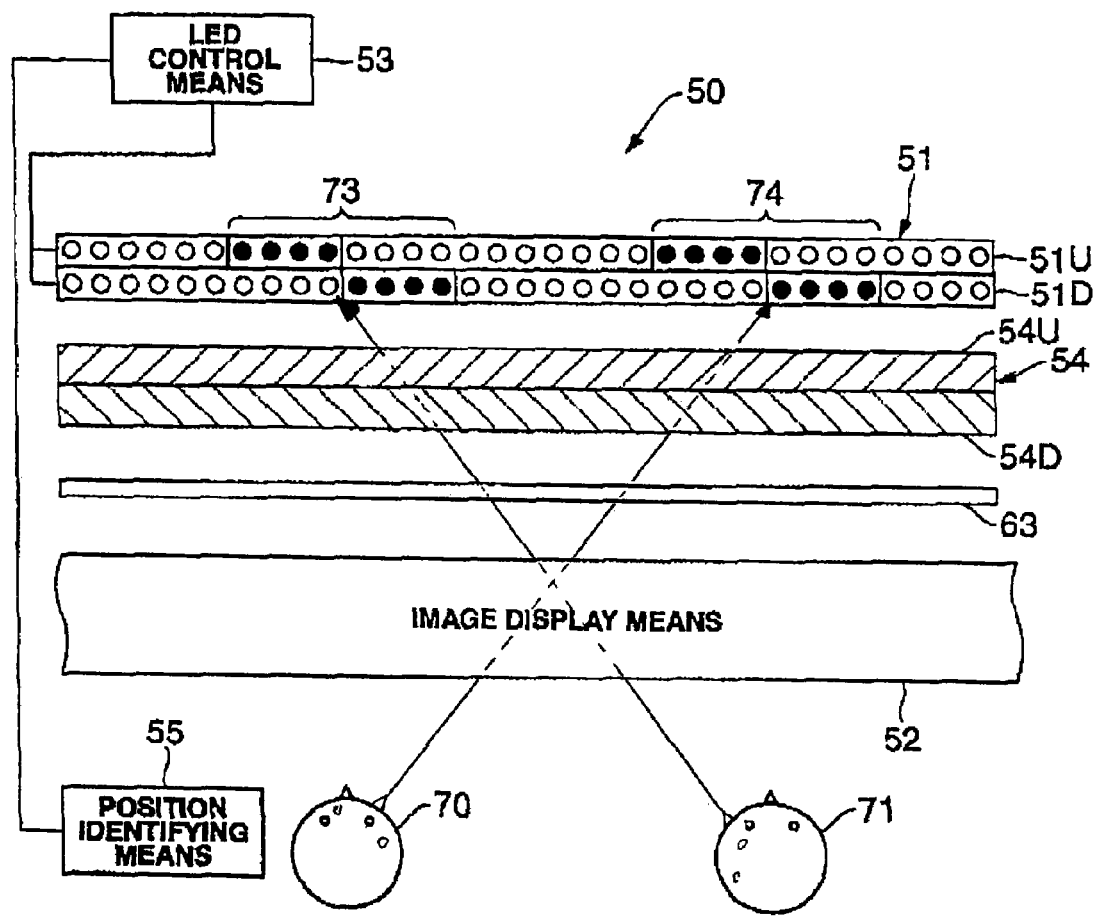
FIG. 1 illustrates a basic principle of a light source device for three-dimensional display according to a first embodiment of the invention.
Figure 2:
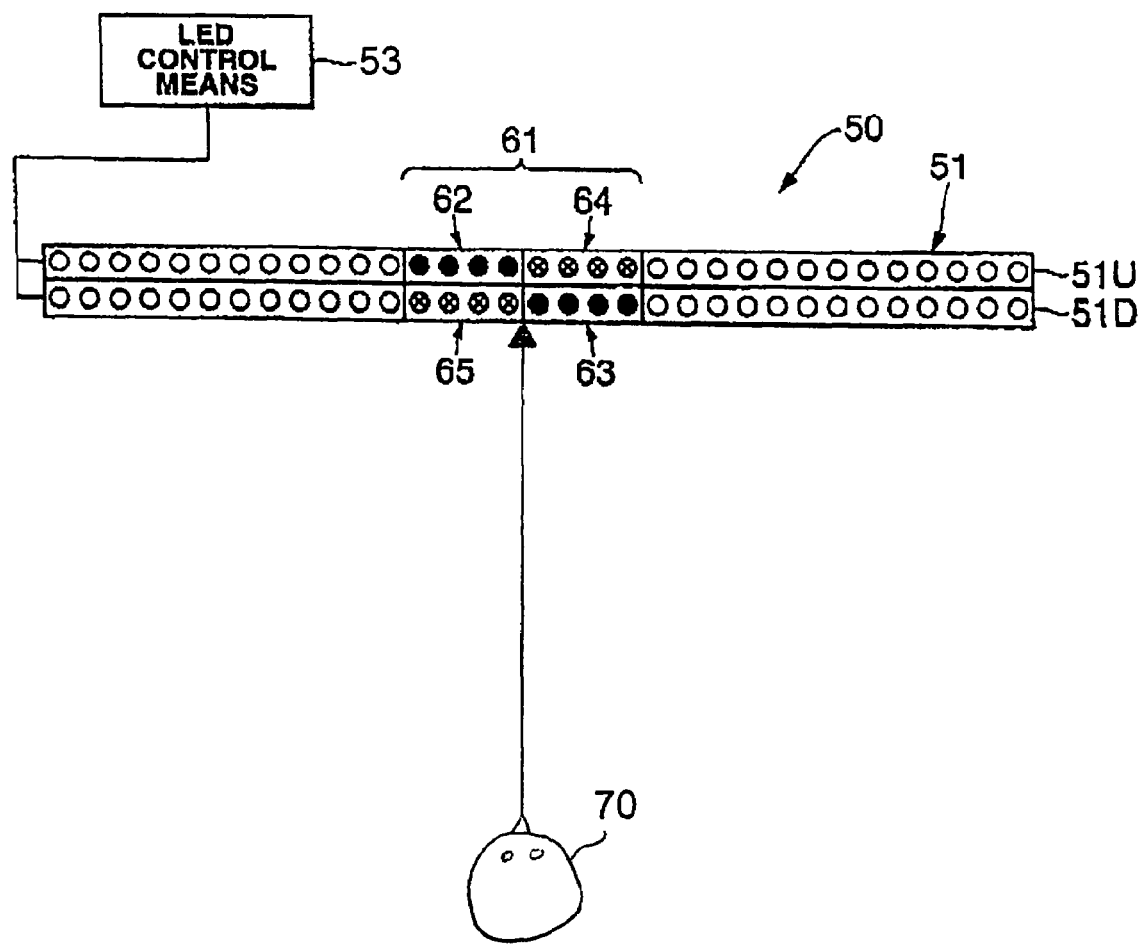
FIG. 2 illustrates a turn-on condition of a light source in a case where a light source device for the three-dimensional displays a 2D image.
Figure 3:
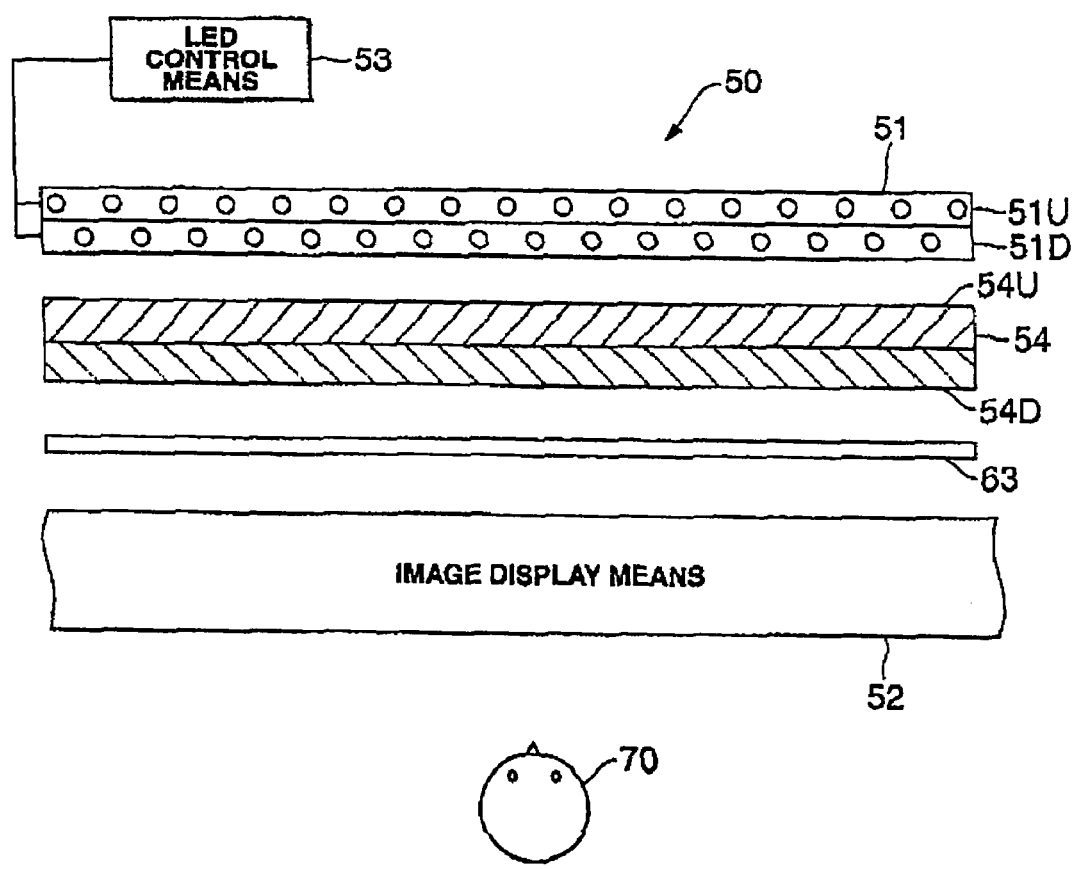
FIG. 3 illustrates a display that uses a light source device for three-dimensional display according to a second embodiment of the invention.

FIG. 1 to FIG. 3 show embodiments of this invention, FIG. 1 to FIG. 2 representing a first embodiment of the invention and FIG. 3 a second embodiment.

Figure 4:
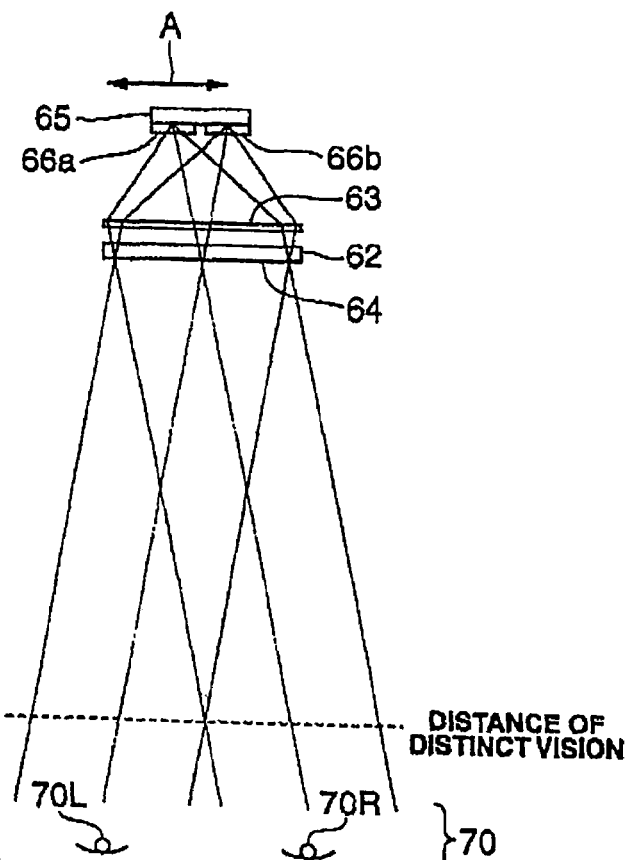
FIG. 4 illustrates an example of a conventional three-dimensional display.
Figure 4:
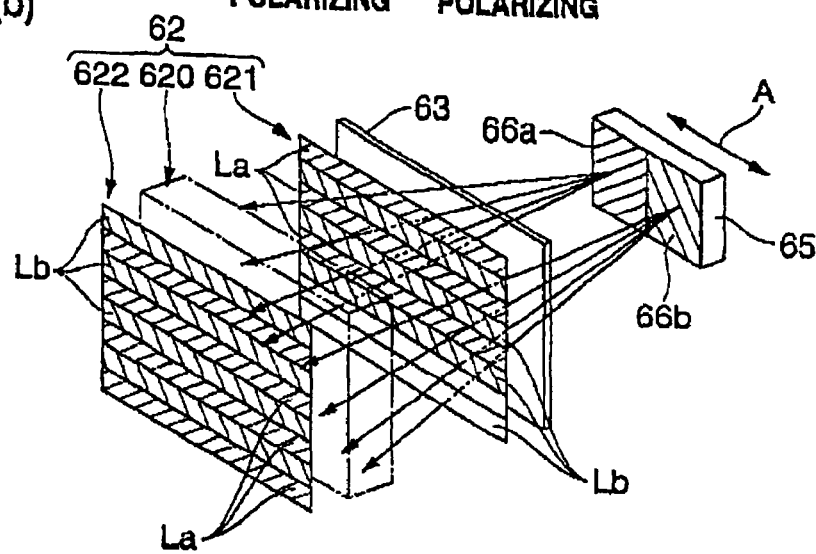

In the following description it is assumed that a display used is a three-dimensional display. In the embodiments that follow, an image display means may use basically the same construction as the display disclosed in Japanese Patent Disclosure No. 10-63199. In that case, as shown in FIG. 4, the image display means has a right-eye polarizing filter portion 66a and a left-eye polarizing filter portion 66b. Rays of light that have passed through the filter portions 66a, 66b are collimated by the Fresnel lens 63 into parallel rays that are then projected onto the liquid crystal device 62.

First Embodiment

In this embodiment, as shown in FIG. 1 and FIG. 2, a light source device 50 for three-dimensional display has an LED array 51 constructed of two tiers, an upper tier 51U and a lower tier 51D. Disposed in front of white LEDs of the LED array 51 is a polarizing filter 54 which has right- and left-eye polarizing filters 54U, 54D corresponding to the upper tier 51U and lower tier 51D of the LED array 51. The polarizing filters 54U, 54D transmit light from the upper tier 51U and the lower tier 51D of the LED array 51, respectively, and have their respective polarization axes set perpendicular to each other.

An LED control means 53 performs an on-off control on each LED array 51U, 51D.

First, let us explain about a case where there is only one observer 71.

A position of the observer 71 is checked by a position identifying means, and an illuminating region 73 of the upper and lower LED arrays 51U, 51D is turned on to present a stereoscopic image to the observer 71. At this time, the illuminating region is moved according to the position of the observer 71 detected by the position identifying means 55 to present a stereoscopic image to the observer. When the observer is located at the center of the LED array 51, it is of course not necessary to provide the position identifying means 55.

Next, a case of two observers 70, 71 will be explained. In this case, as shown in FIG. 1, the LED control means 53 receives signals from the position identifying means 55, sets two illuminating regions 73, 74 on the two LED arrays 51U, 51D, and performs a turn-on control on these illuminating regions alternately at high speed. During this process, LEDs other than those of the illuminating regions 73, 74 are not lighted and, at any given instant, only one of the illuminating regions 73, 74 illuminates. As shown in FIG. 1, the light source device 50 includes an LED array 51 having a plurality of white LEDs arranged in a plurality of horizontal, parallel rows, an image display means 52 and a Fresnel lens 63 acting as a convex lens. The image display means 52 may use a transmission type liquid crystal panel. As shown in FIG. 4, the light source device 50 includes a construction which is arranged along two horizontal, parallel rows of polarizing filters and displays an image information for the right-eye and an image information for the left-eye alternately per horizontal line.

The LED array 51 is turned on and off by the LED control means 53. In FIG. 1 reference number 55 represents a position identifying means that measures the positions of the observers 70, 71. The position identifying means 55 uses a known position detection means of infrared or ultrasonic type to locate the positions of the observers 70, 71 and sends information on the observers' position to the LED control means 53.

In this embodiment, the LED control means 53 quickly turns on and scans illuminating regions of the white LEDs in the LED array 51 to the left and right. In FIG. 1, lit LEDs are represented by black dots "•" and unlit LEDs by blank dots "o" (this representation also applies in the following description).

By performing the turn-off control that turns off the white LEDs 1 during the synchronization signal and blanking periods of the image display means 52, not only can unwanted afterimages and interferences be eliminated but the power consumption can also be reduced. Further, since the right-eye LED array and a left-eye LED array are separated vertically, the distance between the illuminated regions for the right and left eyes can be controlled, enabling display of an appropriate stereoscopic image even if an observer moves backward and forward.

Further, as shown in FIG. 2, if in addition to regions 62, 63 in the two LED arrays 51U, 51D for the right and left eyes, LEDs in regions 64, 65 located above and below the regions 62, 63 are also illuminated at the same time, a 2D image supplied to the three-dimensional image display means is displayed as a two-dimensional or 2D image with increased vertical resolution to the observer 70. In this case, because a light quantity doubles, a brighter image can be displayed. A switchover between a stereoscopic image and a 2D image can easily be done by an electric control and requires no mechanical control. This means no mechanical wear occurs.

Second Embodiment

In this embodiment, as shown in FIG. 3, a light source device 50 for three-dimensional display has an LED array 51 constructed of two tiers, an upper tier 51U and a lower tier 51D, with white LEDs of these tiers alternated in a horizontal position.

In this embodiment, the distance between an upper LED array and a lower LED array can be reduced. That is, this embodiment can reduce crosstalks between the left- and right-eye images and therefore adverse effects on a stereoscopic image formed.

The use of the three-dimensional display of this invention may, for example, include, but is not limited to, display portions of television sets, game machines, personal computers, cell phones and mobile terminals.

Although the LED array 51 in this embodiment is made up of white LEDs, each of the LEDs in the LED array may be formed by combining three primary color LEDs, or RGB LEDs, so that the RGB LEDs as a whole produce white light.

Further, it should be noted that the light source device for three-dimensional display according to this invention is not limited in construction to the embodiments described above and that a variety of modifications may be made without departing from the spirit of the invention.

INDUSTRIAL APPLICABILITY

As described above, the light source device for three-dimensional display according to the present invention offers the following advantages.

According to a first aspect of this invention, a stereoscopic image visualization control with a high degree of freedom can be realized by controlling the turn-on of the right- and left-eye image light source portions in the LED array by the LED control means.

According to a second aspect of this invention, since two horizontal rows of white LED arrays, with a small power consumption and a fast on-off switching speed are used as a light source so as to display a right-eye image and a left-eye image, respectively, a light source can be turned-on or -off by freely controlling the LED control means and the power consumption by a light source device can be reduced.

According to a third aspect of this invention, illuminating points in the right- and left-eye image light source portions can be moved, according to observer position information, at high speed to positions that match the position of an observer. Since during this process no mechanical actions are performed, the control can be made with high accuracy and high durability.

According to a fourth aspect of this invention, illuminating points in the right- and left-eye image light source portions can be moved at high speed to any desired positions by the observer operating the controller.

According to a fifth aspect of this invention, since the display has a position identifying means which counts the number of observers, measures positions of the observers relative to the display and outputs corresponding position signals and since the LED control means performs an on-off control on the white LEDs based on the position information so as to keep images viewable by the observers, appropriate stereoscopic images can be presented to a plurality of viewers located at different positions.

According to a sixth aspect of this invention, since the right- and left-eye image light source portions of the LED array are on-off controlled, a shutter device in a light source can be obviated in a three-dimensional display that displays right- and left-eye images in a time-division manner. This in turn simplifies the construction and eliminates a light transmission loss.

According to a seventh aspect of this invention, since the LED control means changes an interval between lighted parts of the right- and left-eye image light source portions of the LED array according to a distance of an observer from the display, an appropriate stereoscopic image can be presented to the observer wherever the observer is located by changing the interval between the lighted parts of the right- and left-eye image light source portions according to the position of the observer.

According to an eighth aspect of this invention, the two horizontal rows, one above the other, of the white LEDs or RGB LEDs in the LED array are arranged such that the LEDs in one of the rows are alternated from or placed side by side with those in the other row, and the LED control means performs the turn-on control on the LED horizontal rows in the LED array. In this invention, when the two rows of LEDs are turned on simultaneously, the light quantity doubles, forming a brighter image. Further, the simultaneous lighting of the two LED rows can display a 2D image signal on a three-dimensional display.

According to a ninth aspect of this invention, because the LED control means turns on and off appropriate white LEDs in the LED array and scans the illuminating LEDs across the LED array at high speed in a horizontal direction, a wide viewing angle image can be created with a limited number of LEDs as a light source in a two-dimensional display.

According to a tenth aspect of this invention, a stereoscopic image can be formed not only on large screens of television sets, game machines and personal computers but also on small screens of cell phones and mobile terminals which can easily move relative to sight lines of observers. These screens can also display two-dimensional images that require a wide viewing angle.

What is claimed is:

1. A light source device for three-dimensional display having an image display means, wherein the image display means forms an image using transmitted light, the light source device comprising:
   an LED array having white LEDs or RGB LEDs arranged in two horizontal rows one above the other; and
   an LED control means for performing an on-off control on the horizontal rows of the white LEDs or RGB LEDs in the LED array,
   wherein the display is a three-dimensional display to present different images to right and left eyes of an observer and the upper and lower LED arrays constitute a light source portion for presenting an image for the right eye and a light source portion for presenting an image for the left eye, respectively.

2. A light source device for three-dimensional display according to claim 1, wherein the three-dimensional display has a portion identifying means which measures a position of an observer relative to the three-dimensional display and outputs a corresponding position signal, and the LED control means performs a turn-on control on the white LEDs or RGB LEDs based on the position information so as to keep an image viewable to the observer.

3. A light source device for three-dimensional display according to claim 1, wherein the three-dimensional display has a controller operated by the observer, and the LED control means performs an on-off control on the white LEDs or RGB LEDs based on operation information from the controller so as to change an image viewed by the observer.

4. A light source device for three-dimensional display according to claim 1, wherein the three-dimensional display has a position identifying means which counts the numbers of observers, measures positions of the observers relative to the display and outputs corresponding position signals, and the LED control means performs an on-off control on the white LEDs or RGB LEDs based on the position information so as to keep images viewable by the observers.

5. A light source device for three-dimensional display according to claim 1, wherein the LED control means performs a turn-on control on the right-eye image light source portion and the left-eye image light source portion of the LED array.

6. A light source device for three-dimensional display according to claim 1, wherein the LED control means changes an interval between lighted parts of the right-eye image light source portion and the left-eye image light source portion of the LED array according to a distance of an observer from the display.

7. A light source device for three-dimensional display according to claim 1, wherein the two horizontal rows, one above the other, of the white LEDs or RGB LEDs in the LED array is arranged such that the white LEDs or RGB LEDs in one of the rows are placed side by side with or staggered to those in the other row, and the LED control means performs the on-off control on the horizontal rows of the white LEDs or RGB LEDs in the LED array.

8. A light source device for three-dimensional display according to any of claims 1 to 7, wherein the LED control means turns on appropriate white LEDs in the LED array and scans the illuminating LEDs across the LED array at high speed in a horizontal direction.

9. A light source device for three-dimensional display according to any one of claims 1 to 7, which is used on three- or two-dimensional displays of television sets, game machines, personal computers, cells phones or mobile terminals.

* * * * *